(12) United States Patent
Kargl

(10) Patent No.: US 8,833,666 B2
(45) Date of Patent: Sep. 16, 2014

(54) SMART CARD DEVICE

(75) Inventor: Walter Kargl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/415,937

(22) Filed: Mar. 9, 2012

(65) Prior Publication Data

US 2013/0233929 A1    Sep. 12, 2013

(51) Int. Cl.
*G06K 19/06* (2006.01)
(52) U.S. Cl.
USPC .......................................... 235/492
(58) Field of Classification Search
USPC ................................ 235/487, 492
See application file for complete search history.

(56) References Cited

U.S. PATENT DOCUMENTS

| 6,223,990 | B1 * | 5/2001 | Kamei .......................... 235/492 |
| 7,925,223 | B2 | 4/2011 | Raggam |
| 2004/0164864 | A1 * | 8/2004 | Chung et al. ................ 340/572.7 |
| 2010/0072277 | A1 * | 3/2010 | Kim .............................. 235/492 |
| 2010/0311328 | A1 * | 12/2010 | Kargl et al. .................. 455/41.2 |
| 2011/0226859 | A1 * | 9/2011 | Chen et al. .................... 235/492 |

FOREIGN PATENT DOCUMENTS

| DE | 102008034001 A1 | 1/2009 |
| DE | 102010017202 A1 | 1/2011 |

* cited by examiner

*Primary Examiner* — Sujoy Kundu
*Assistant Examiner* — Steven J Malone

(57) ABSTRACT

In various embodiments a smart card device is provided, including a processor, a power interface configured to provide power to at least one smart card device external device, a first receiving antenna configured to provide power to the processor, and a second receiving antenna configured to provide power to the power interface.

20 Claims, 2 Drawing Sheets

SMART CARD DEVICE

TECHNICAL FIELD

Various embodiments relate to a smart card device.

BACKGROUND

Smart cards (also referred to as chip cards or ICCs (integrated circuit card)) can be found in a variety of applications, for example as reliable portable means of identification, authentication or as portable means for data storage or data processing. Due to their practicality and the resulting applicability in various technical fields, their performance and usability have been constantly improved. One such improvement may be seen in the provision of contactless smart cards which do not have to be inserted into a reader during use but can, for example, remain in a wallet which, together with the respective contactless smart card to be contacted tucked inside, may be placed on a contact field of the reader or can be swiped past the reader. There are also dual-interface chip cards available, which offer both a contact based interface, such as the standard chip card interface as defined by the ISO/IEC 7816-2 standard, and a contactless interface, which is usually provided by a chip card antenna.

In contactless smart cards, magnetic fields are used to supply the card with power and to exchange data between the smart card and the reader. The energy which is needed to power the processor or microcontroller circuit which may be provided on the chip card in the form of a chip or other circuits/components is drawn from the magnetic field provided by the reader. Therefore, a contactless microcontroller which is coupled to one antenna may be provided in the smart card in order to supply energy to external components of the smart card and to the main microcontroller or processor of the smart card. Since the whole system including the chip card and optional external components, such as a keyboard, various sensors or a display, is then supplied with power via one interface of the single contactless microcontroller, an interdependency or interference between the different processes may be present, for example between the process of contactless communication, the execution or operation of the main microcontroller of the smart card and the supply of external components with power. Area optimized input structures on the smart card may even make it impossible to supply external components with power, as the surplus system current is shunted via an internal VDD shunt to save chip area.

SUMMARY

In various embodiments a smart card device is provided, including a processor, a power interface configured to provide power to at least one smart card device external device, a first receiving antenna configured to provide power to the processor, and a second receiving antenna configured to provide power to the power interface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
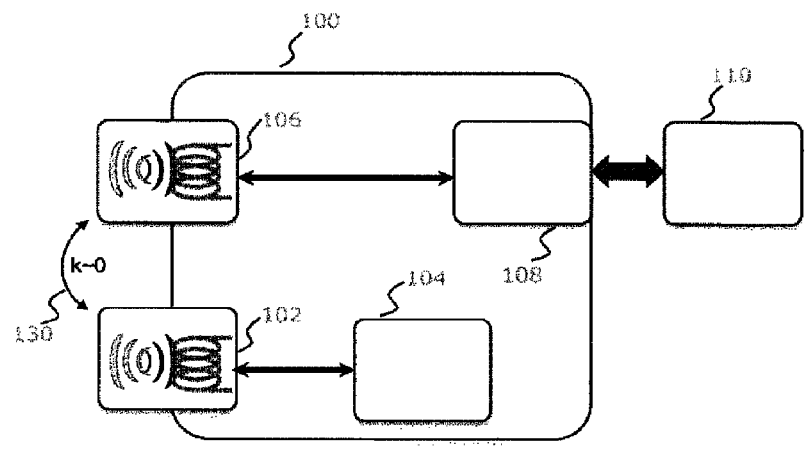
FIG. 1 shows an exemplary implementation of a smart card device according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In accordance with various embodiments of the smart card device two independent input structures may be used to supply power to the smart card device and smart card device external devices (will be referred to as external devices in the following) such as a keyboard, sensors or a display which may be coupled to the smart card device. One input structure, for example a first receiving antenna may be coupled to a first circuit and may be used to supply energy to a standard microcontroller or a processor which may be provided as a chip on the smart card device according to various embodiments. However, the first receiving antenna may also be configured as a data transmission antenna and be used for sending and receiving data. A further input structure, for example a second receiving antenna may be coupled to a second circuit and may be used to supply energy to external devices or other additional circuits which may be provided in the smart card device. However, the second receiving antenna may also be configured as a data transmission antenna and be used for sending and receiving. In other words, the first circuit and the second circuit may be connected to the first receiving antenna and the second receiving antenna, respectively, wherein the receiving antennas are capable of providing energy from an electromagnetic field provided by a reader (or receive and send data from and to the reader). The receiving antennas may be provided in the smart card device and their geometry, form and arrangement may be configured such that there is almost no inductive coupling or only negligible inductive coupling between the two antennas. In various embodiments inductive coupling of the receiving antennas is understood to be the process of energy transfer from one receiving antenna to the other receiving antenna by means of mutual inductance. The standard microcontroller or the processor of the smart card device according to various embodiments may operate a contactless interface in the sense that power may be drawn from an electromagnetic field or data may be received or transmitted without affecting the process of powering external devices as those may be supplied with power and/or send and receive data via the second receiving antenna and the second circuit. The voltage provided in the first circuit and the voltage provided in the second circuit may be set independently from each other according to need. For example, different voltage levels may be provided in each of the circuits such that they are optimized to suit the electronic or hardware components included in the respective circuit or to fit the usage profile of the electronic or hardware components included in the respective circuit.

The first receiving antenna and the second receiving antenna may be provided in the form of a dual antenna structure, wherein the dual antenna structure is configured such that the coupling between the first receiving antenna and the second receiving antenna is reduced to a minimum. The coupling coefficient between the two receiving antennas may be smaller than 0.3 and may, for example, be smaller than 0.2, wherein a coupling coefficient of 0 denotes a state of no inductive coupling between the receiving antennas and a coupling coefficient of 1 denotes a state of maximal inductive coupling between the two receiving antennas. The decoupling between the first receiving antenna and the second receiving antenna may be implemented via field suppression which may be adjusted by adapting the geometry of the receiving antennas and their spatial relation with respect to each other. In general, field suppression may occur when two voltages are generated or induced in the receiving antenna which have the same amplitude but are out of phase by 180.

As already mentioned, the first receiving antenna and the second receiving antenna may be used to send and receive data to and from a reader. In various embodiments of the smart card device, independent communication may include use of different frequencies, different communication protocols, and/or the possibility of communication of independent, e.g. different, data. When a load is coupled to a receiving antenna of the smart card device, properties such as the resonance frequency or the Q factor of the respective antenna may be altered. During operation of one of the receiving antennas its outer field lines are identical to the outer field lines of the field induced in the other receiving antenna and its outer field lines are identical to the outer field lines of the field induced in the other receiving antenna. Thereby the field in the other receiving antenna may be suppressed which results in a decoupling of the receiving antennas. As an alternative, the decoupling may be provided by applying compensation voltage(s) or current(s).

The smart card device as referred to herein may include a contactless chip card as defined in the ISO/IEC 7816 standard. The size of the smart card device according to various embodiments may, for example, correspond to any for the formats as defined in the ISO/IEC 7810 standard, for example the ID-1, or the ID-2 format. The communication interface of the smart card device according to various embodiments may be configured such that, for example, it is compliant with the ISO/IEC 14443 standard. However, the smart card device according to various embodiments may be configured as a dual-interface chip card and in addition to the contactless interface include a contact based interface in the form of a contact field as defined in the ISO/IEC 7816 standard.

In FIG. 1, an exemplary implementation of a smart card device 100 according to various embodiments is shown. The smart card device 100 may include a first receiving antenna 102 and a second receiving antenna 106. The first receiving antenna 102 may be connected to a standard microcontroller or a processor 104. The first receiving antenna 102 may be configured to provide power to the processor 104. The second receiving antenna 106 may be connected to a power interface 108. The second receiving antenna 106 may be configured to provide power to the power interface 108. In some embodiments, the second receiving antenna 106 may be configured to also provide power to the processor 104. At least one external device 110 may be inductively or galvanically coupled to the power interface 108 and thereby be provided with power from the second receiving antenna 106 via the power interface 108. The first receiving antenna 102 and the second receiving antenna 106 may be provided in the form of a flat coil and may include one or more windings. The geometry of each of the receiving antennas and the spatial relation between the first receiving antenna 102 and the second receiving antenna 106 may be chosen such that the inductive coupling 130 which may be quantified by the coupling coefficient k may be minimized. In other words, the first receiving antenna 102 and the second receiving antenna 106 may be inductively decoupled or the inductive coupling between them may be negligible.

Figure 2:
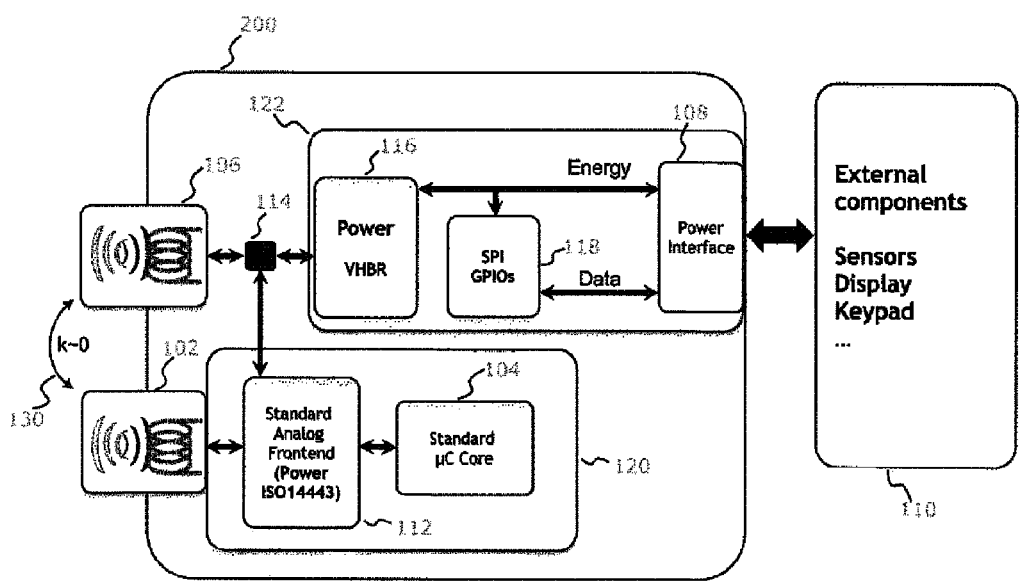
FIG. 2 shows a further exemplary implementation of a smart card device according to various embodiments.

In FIG. 2 a further exemplary implementation of a smart card device 200 according to various embodiments is shown. The smart card device 200 in FIG. 2 is based on the smart card device 100 shown in FIG. 1, thus the same elements carry the same reference numbers and will not be described in detail again.

The smart card device 200 according to various embodiments shown in FIG. 2 includes the first receiving antenna 102 and the second receiving antenna 106. The first receiving antenna 102 is connected to a connection module 112, for example a standard analog frontend in accordance with the ISO/IEC 1443 standard, which is included in the first circuit 120. The first circuit 120 further includes a processor 104 which is coupled to the first connection module 112. The first connection module 112 may be configured to provide the energy from the first receiving antenna 102 to the processor 104 and to other electronic components or circuits which may be provided in the smart card device 200. In the following, the mention of the chip 104 or the first circuit as a consumer of the energy provided thereto shall include the possibility of other electronic components or circuits which may be provided in the smart card device 200 to be consumers of that energy as well. The first connection module 112 may be further configured to adapt parameters of the energy (i.e. current and/or voltage) provided to the chip 104.

The second receiving antenna 106 of the smart card device 200 according to various embodiments shown in FIG. 2 is connected to a switch 114. The switch 114 may be configured to connect the second receiving antenna 106 either with a second circuit 122, for example with a second connection module 116 thereof, or with the first circuit, for example the first connection module 112 thereof. The second connection module 116 is connected to the power interface 108 and to a communication module 118. The communication module 118 and the power interface 108 may be provided with energy from the second connection module 116 if the switch 114 is set correspondingly. The communication module 118 may include various communication interfaces such as at least one SPI (serial peripheral interface) and/or one GPIO (general purpose input/output). The communication module 118 is connected to the power interface 108 and may exchange data with the power interface 108. At least one of various external devices 110, such as a sensor, a keyboard and/or a display may be coupled to the smart card device 200 according to various embodiments, for example to the power interface 108. Thereby, the at least one external device 110 may be provided with power from the second receiving antenna 106 if the switch 114 is set appropriately, i.e. if the switch 114 set to connect the second receiving antenna 106 with the second circuit, for example the second connection module 116 thereof. In analogy to the first connection module 112 the second connection module 116 may be configured to adapt parameters of the energy (i.e. current and/or voltage) provided to the connection module 118 and the power interface 108.

The first receiving antenna 102 and the second receiving antenna 106 may be further configured to receive data from and transmit data to a reader (not shown in FIG. 2) such that the processor 104 may communicate with a reader via the first connection module 112 and the first receiving antenna 102, and/or independently therefrom, the at least one external device may communicate with a reader via the second connection module 116 and the second receiving antenna 106.

The switch 114 provided in the smart card device 200 according to various embodiments is configured to couple the second receiving antenna 106 either to the second circuit 122 or to the first circuit 120. Consequently, it is possible to supply energy to the first circuit 120 by means of the first receiving antenna 102 and the second receiving antenna 106, when the switch 114 is set to connect the second receiving antenna 106 with the first circuit 120. Thereby, an increased amount of energy may be provided to the first circuit 120 in comparison to the case where only the first receiving antenna 106 is coupled to the first circuit 120. Furthermore, in the case where each of the receiving antennas is optimized to couple to a different electromagnetic field with correspondingly different frequencies, energy may be drawn from the two different magnetic fields and supplied to the first circuit 120, for example, if an increased power demand within the first circuit 120 is detected. In analogy, if the receiving antennas are optimized for different electromagnetic fields, data may be sent and received from the first circuit 120 over the two different electromagnetic fields.

Figure 3:
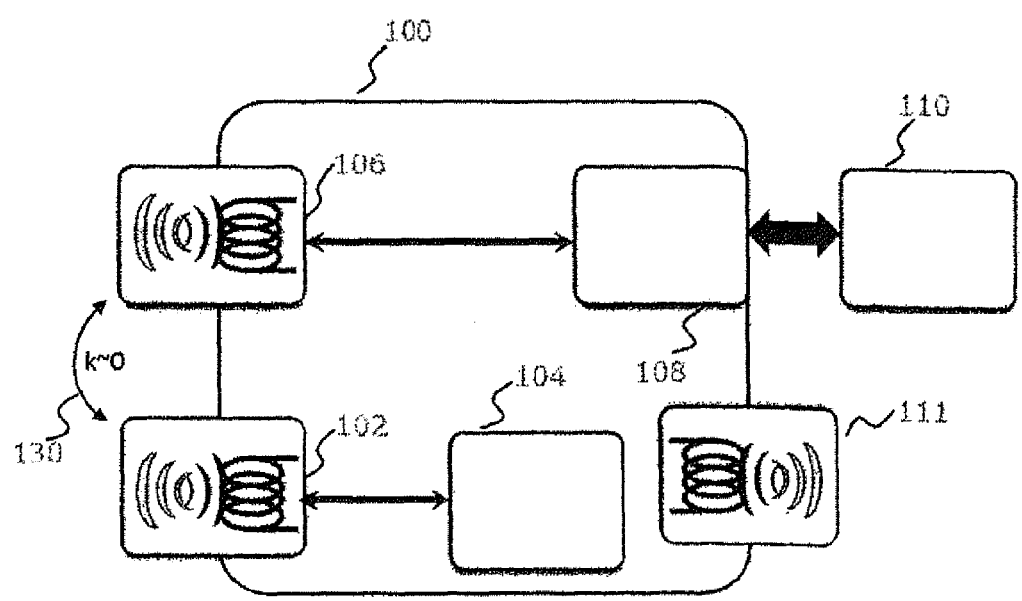
FIG. 3 shows yet a further exemplary implementation of a smart card device according to various embodiments.

The smart card device according to various embodiments may include further receiving antennas, such as the further antenna 111 shown in FIG. 3, which may be coupled to the first circuit 120 and/or the second circuit 122 (the connections between the further antenna 111 and the first circuit 120 and/or the second circuit 122 are not explicitly shown in FIG. 3). The further receiving antennas may be configured to provide energy and/or data transmission for the same communication standard as the first receiving antenna 102 and/or the second receiving antenna 106 or for different communication standards, for example the Bluetooth communication standard.

In the foregoing paragraphs, the word module, such as the communication module 118, shall refer to a stand-alone circuit or integrated circuit such as a microcontroller, which is configured to provide the corresponding functionality as described with respect to the module.

In accordance with various embodiments, a smart card device is provided which may include a processor, a power interface configured to provide power to at least one smart card device external device, a first receiving antenna configured to provide power to the processor, and a second receiving antenna configured to provide power to the power interface.

According to further embodiments, the smart card device may further include a primary circuit, wherein the primary circuit may include the processor.

According to various further embodiments of the smart card device the primary circuit may be coupled to the first receiving antenna.

According various to further embodiments, the smart card device may further include a secondary circuit, wherein the secondary circuit may include the power interface.

According to various further embodiments of the smart card device the power interface may be configured to couple the secondary circuit galvanically to the at least one smart card device external device.

According to various further embodiments of the smart card device the power interface may be configured to couple the secondary circuit inductively to the at least one smart card device external device.

According to various further embodiments, the smart card device may further include a selecting switch, which may be connected to the second receiving antenna and which is configured to selectively couple the second receiving antenna to the primary circuit or to the secondary circuit.

According to various further embodiments of the smart card device the primary circuit and the secondary circuit may be electrically decoupled from each other.

According to various further embodiments of the smart card device the first receiving antenna and the second receiving antenna may be substantially inductively decoupled from each other.

According to various further embodiments of the smart card device, outer field lines of the receiving antennas may be substantially identical and inner field lines of the receiving antennas may be substantially identical. As an alternative, the decoupling may be provided by applying compensation voltage(s) or current(s).

According to various further embodiments of the smart card device the first receiving antenna and/or the second receiving antenna may be further configured as a data transmitting antenna.

According to various further embodiments of the smart card device, the first receiving antenna and the second receiving antenna may be configured to independently transmit data.

According to various further embodiments, the smart card device may further include at least one further receiving antenna.

In accordance with various embodiments, a smart card device is provided which may include a processor, a circuit, a first receiving antenna configured to provide power to the processor and a second receiving antenna configured to provide power to the circuit.

According to further embodiments, the smart card device may further include a further circuit, wherein the further circuit may include the processor.

According to various further embodiments of the smart card device, the further circuit may be coupled to the first receiving antenna.

According to various further embodiments of the smart card device, the circuit may be configured to couple galvanically to at least one smart card device external device.

According to various further embodiments of the smart card device, the circuit may be configured to couple inductively to at least one smart card device external device.

According to various further embodiments, the smart card device may further include a switch which is connected to the second receiving antenna and which is configured to selectively couple the second receiving antenna to the primary circuit or to the secondary circuit.

According to various further embodiments of the smart card device, the circuit and the further circuit may be electrically decoupled from each other.

According to various further embodiments of the smart card device, the first receiving antenna and the second receiving antenna may be substantially inductively decoupled from each other.

According to various further embodiments of the smart card device, the outer field lines of the receiving antennas may be substantially identical and inner field lines of the receiving antennas may be substantially identical.

According to various further embodiments of the smart card device, the first receiving antenna and/or the second receiving antenna may be further configured as a data transmitting antenna.

According to various further embodiments of the smart card device, the first receiving antenna and the second receiving antenna may be configured to independently transmit data.

According to various further embodiments, the smart card device may further include at least one further receiving antenna.

In accordance with various embodiments a smart card device is provided which may include a processor, a first receiving antenna configured to provide power to the processor and a second receiving antenna configured to provide power to the processor.

According to further embodiments, the smart card device may further include a first circuit, wherein the first circuit comprises the processor.

According to various further embodiments of the smart card device, the first circuit may be coupled to the first receiving antenna.

According to various further embodiments, the smart card device may further include a second circuit configured to provide power from the second receiving antenna to at least one smart card device external device.

According to various further embodiments of the smart card device, the second circuit may be configured to couple galvanically to the at least one smart card device external device.

According to various further embodiments of the smart card device, the second circuit may be configured to couple inductively to the at least one smart card device external device.

According to various further embodiments, the smart card device may further include a select switch which may be connected to the second receiving antenna and which may be configured to selectively couple the second receiving antenna to the first circuit or to the second circuit.

According to various further embodiments of the smart card device, the first circuit and the second circuit are electrically decoupled from each other.

According to various further embodiments of the smart card device, the first receiving antenna and the second receiving antenna may be substantially inductively decoupled from each other.

According to various further embodiments of the smart card device, outer field lines of the receiving antennas may be substantially identical and inner field lines of the receiving antennas may be substantially identical.

According to various further embodiments of the smart card device, the first receiving antenna and/or the second receiving antenna may be further configured as a data transmitting antenna.

According to various further embodiments of the smart card device, the first receiving antenna and the second receiving antenna may be configured to independently transmit data.

According to various further embodiments, the smart card device may further include at least one further receiving antenna.

In accordance with various embodiments, a smart card device is provided which may include at least two receiving antennas configured to provide power.

According to further embodiments, the smart card device may further include a chip, and a first circuit comprising the chip.

According to various further embodiments of the smart card device, the first receiving antenna may be coupled to the first circuit.

According to various further embodiments, the smart card device may further include a second circuit, wherein the second circuit includes a power interface at which power may be provided.

According to various further embodiments of the smart card device, the power interface may be configured to couple galvanically to the at least one smart card device external device.

According to various further embodiments of the smart card device, the power interface may be configured to couple inductively to the at least one smart card device external device.

According to various further embodiments, the smart card device may further include a selecting switch which is connected to one of the receiving antennas and which is configured to selectively couple the one receiving antenna to the first circuit or the second circuit.

According to various further embodiments of the smart card device outer field lines of the at least two receiving antennas may be substantially identical and inner field lines of the at least two receiving antennas may be substantially identical.

According to various further embodiments of the smart card device the receiving antennas may be configured to be substantially decoupled from each other.

According to various further embodiments of the smart card device at least one of the at least two receiving antennas may be further configured as a data transmitting antenna.

According to various further embodiments of the smart card device the at least two receiving antennas may be configured to independently transmit data.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An integrated smart card device, comprising:
   a first power source comprising a first receiving antenna configured to provide power;
   a second power source comprising a second receiving antenna configured to provide power;
   a processor coupled to the first antenna via an analog frontend connection module, the processor configured to receive and operate primarily by power provided by the connection module and received from the first antenna; and
   a power interface coupled to the second antenna and configured to receive and operate primarily by power provided by the second antenna and further configured to act as a third power source and provide at least a portion of the received power to power at least one smart card device external device,
   wherein the smart card device external device is located outside the smart card device and that is configured to receive and operate primarily by the power provided by the power interface, and wherein a voltage level of the power provided by the first power source and a voltage level of the power provided by the second power source are independent from each other.

2. Smart card device of claim 1, further comprising:
a primary circuit, wherein the primary circuit comprises the processor.

3. Smart card device of claim 2,
wherein the primary circuit is coupled to the first receiving antenna.

4. Smart card device of claim 3, further comprising:
a secondary circuit, wherein the secondary circuit comprises the power interface.

5. Smart card device of claim 4,
wherein the power interface is configured to couple the secondary circuit galvanically to the at least one smart card device external device.

6. Smart card device of claim 4,
wherein the power interface is configured to couple the secondary circuit inductively to the at least one smart card device external device.

7. Smart card device of claim 4, further comprising:
a selecting switch, which is connected to the second receiving antenna and which is configured to selectively couple the second receiving antenna to the primary circuit or to the secondary circuit.

8. Smart card device of claim 1,
wherein the first receiving antenna and the second receiving antenna are substantially inductively decoupled from each other.

9. Smart card device of claim 1, further comprising:
at least one further receiving antenna.

10. A smart card device, comprising:
a first power source comprising a first receiving antenna configured to provide power;
a second power source comprising a second receiving antenna configured to provide power;
a processor coupled to the first receiving antenna via an analog frontend connection module, the processor configured to receive and operate primarily by power provided by the connection module and received from the first receiving antenna; and
a circuit coupled to the second receiving antenna and configured to receive and operate primarily by power provided by the second receiving antenna, and further configured to act as a third power source and provide at least a portion of the received power to at least one smart card device external device,
wherein the smart card device external device is located outside the smart card device and that is configured to receive and operate primarily by the power provided by the circuit; and
wherein a voltage level of the power provided by the first power source and a voltage level of the power provided by the second power source are independent from each other.

11. Smart card device of claim 10, further comprising:
a further circuit, wherein the further circuit comprises the processor.

12. An integrated smart card device, comprising:
a first power source comprising a first receiving antenna configured to provide power;
a second power source comprising a second receiving antenna configured to provide power at least to a smart card external device; and
a processor coupled to the first receiving antenna and to the second receiving antenna via an analog front end connection module and configured to receive and operate primarily by power provided by the connection module and received from the first receiving antenna and received from the second receiving antenna,
wherein the smart card device external device is located outside the smart card device and that is configured to receive and operate primarily by the power provided by the second receiving antenna, and
wherein a voltage level of the power provided by the first power source and a voltage level of the power provided by the second power source are independent from each other.

13. Smart card device of claim 12, further comprising:
a first circuit, wherein the first circuit comprises the processor.

14. Smart card device of claim 13,
wherein the first circuit is coupled to the first receiving antenna.

15. Smart card device of claim 14, further comprising:
a second circuit configured to provide power from the second receiving antenna to at least the smart device external device.

16. Smart card device of claim 15, further comprising:
a select switch, which is connected to the second receiving antenna and which is configured to selectively couple the second receiving antenna to the first circuit or to the second circuit.

17. Smart card device of claim 16,
wherein the first circuit and the second circuit are electrically decoupled from each other.

18. Smart card device of claim 12,
wherein the first receiving antenna and the second receiving antenna are substantially inductively decoupled from each other.

19. Smart card device of claim 12,
wherein outer field lines of the receiving antennas are substantially identical and
wherein the inner field lines of the receiving antennas are substantially identical.

20. Smart card device of claim 12,
wherein the first receiving antenna and/or the second receiving antenna are/is further configured as a data transmitting antenna.

* * * * *